July 26, 1955  E. W. BAGNELL  2,713,911

FORMATION TESTING APPARATUS FOR DEEP WELLS

Filed Sept. 1, 1950  4 Sheets-Sheet 1

INVENTOR.
EDGAR W. BAGNELL

BY
*Mellin and Hanscom*
ATTORNEYS

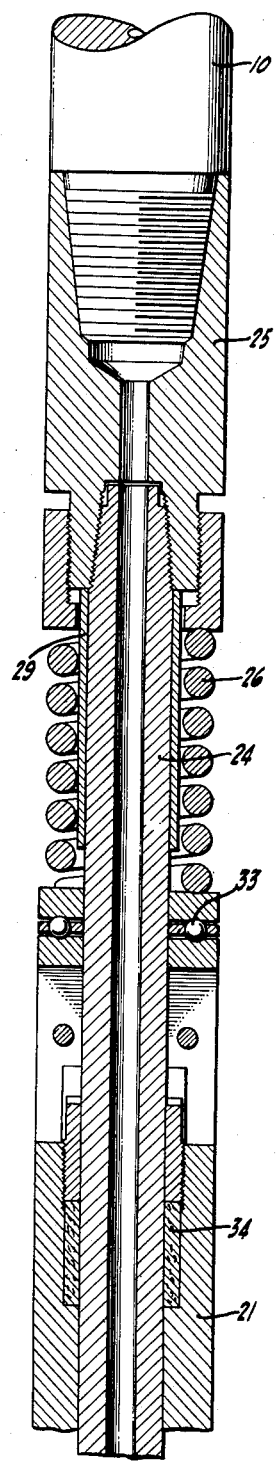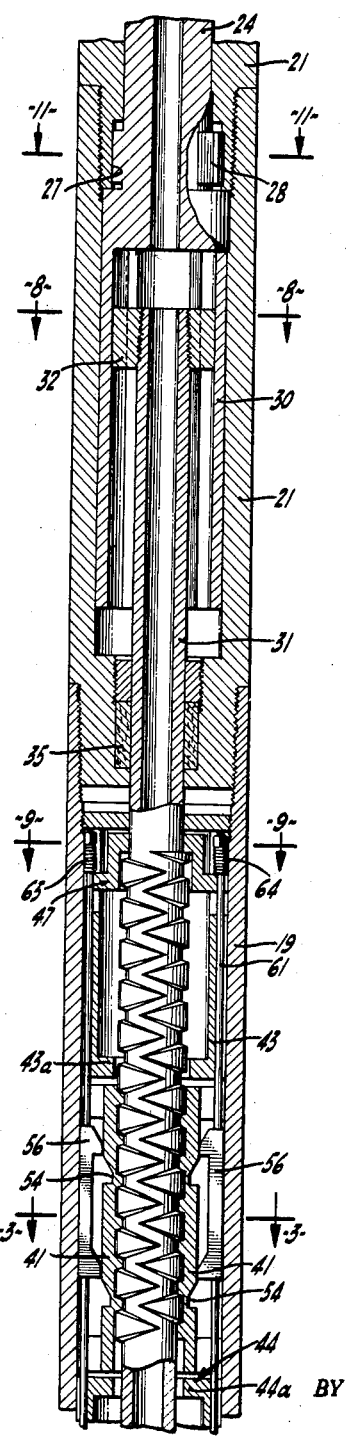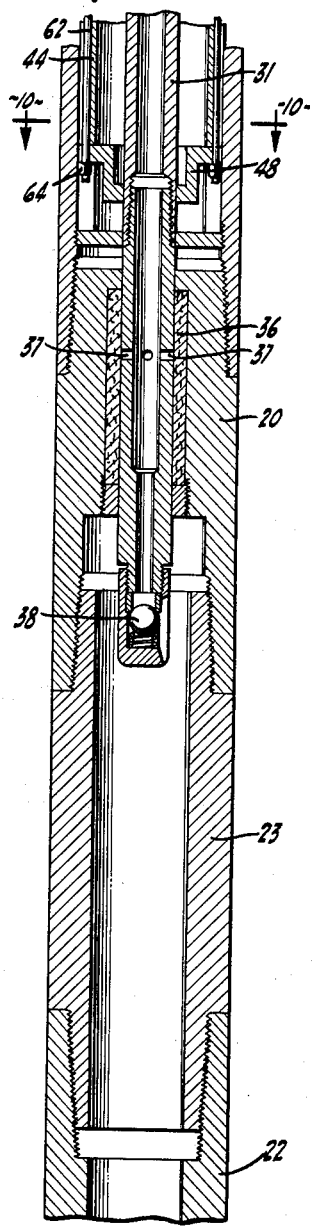

July 26, 1955 E. W. BAGNELL 2,713,911
FORMATION TESTING APPARATUS FOR DEEP WELLS
Filed Sept. 1, 1950 4 Sheets-Sheet 3
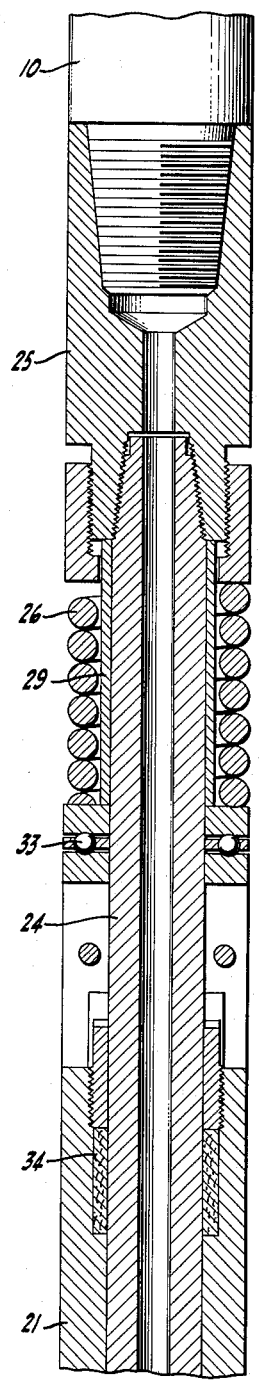
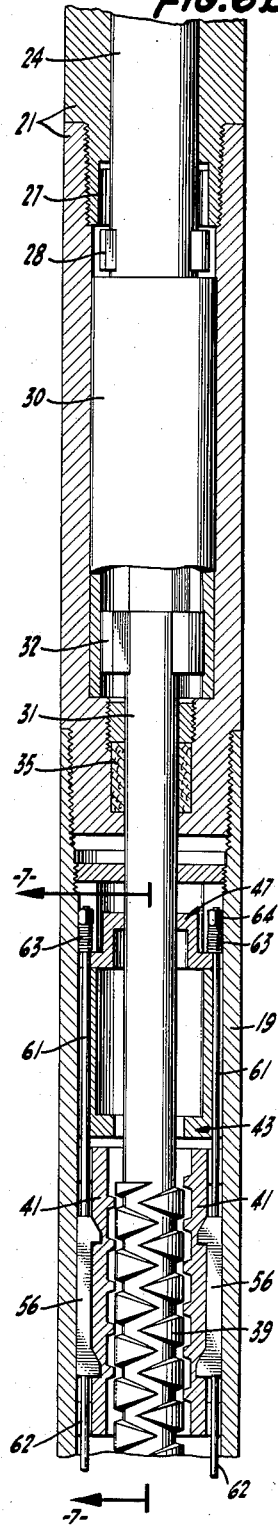
INVENTOR.
EDGAR W. BAGNELL
BY
ATTORNEYS July 26, 1955

E. W. BAGNELL 2,713,911

FORMATION TESTING APPARATUS FOR DEEP WELLS

Filed Sept. 1, 1950

INVENTOR.
EDGAR W. BAGNELL
BY
*Mellin and Hanscom*
ATTORNEYS

United States Patent Office 2,713,911
Patented July 26, 1955

2,713,911

FORMATION TESTING APPARATUS FOR DEEP WELLS

Edgar W. Bagnell, Glendale, Calif., assignor, by mesne assignments, to Johnston Testers, Inc., Houston, Tex., a corporation of Delaware Application September 1, 1950, Serial No. 182,801

5 Claims. (Cl. 166—152)

This invention relates to formation testing apparatus for use in deep oil well bores for obtaining a sample of the formation fluid at a predetermined point therein.

It is the principal object of the present invention to generally improve formation testing tools by providing an imprroved valve and valve operating mechanism therefor, which is positively operable by rotation of the testing string at the top of the bore in a single direction to alternately open and close the sample receiving tubing, while the packer of the latter is maintained tightly seated and unrelieved of the weight of the testing string thereon.

It is a further object of the present invention to provide an improved valve mechanism for well testing apparatus and the like which is movable from open to closed position and vice versa positively by rotation of an element thereof in but a single direction, and which valve mechanism is mechanically prevented from operation during the running in of the tool to the point of testing and during the pulling out of the tool from the well after the test sample has been taken.

It is an additional object of the present invention to provide an improved well testing tool valve which may be moved alternately from open to closed condition by rotation of the testing string in a single direction, which valve is automatically clutched from opening and closing movement during the running-in and pulling-out operation of the testing tool in which it is incorporated.

It is a further object of the present invention to provide an improved well testing tool having a valve mechanism which is operable so that it may be moved from open to closed condition by rotation of the well testing tool at the surface of the well in a single direction, which tool is provided with an operable clutch mechanism to render rotation of the tool ineffective to either open or close the valve by rotation of the tool during the time in which the tool is being run in or being pulled from the hole.

One form which the invention may assume is exemplified in the following description and illustrated by way of example in the accompanying drawings, in which:

Figs. 5a, 5b and 5c are views in central vertical section through the improved valve structure of my improved formation tester, the three views when placed end to end constituting a complete sectional picture of the portion of the tool referred to, showing the valve mechanism in the condition which it assumes when the valve is in closed position.

Figs. 6a, 6b and 6c are views similar to Figs. 5a, 5b and 5c with the exception that certain of the parts are not shown in central section and also showing that portion of the structure in the condition the parts assume when the valve is in open position.

Figure 1:
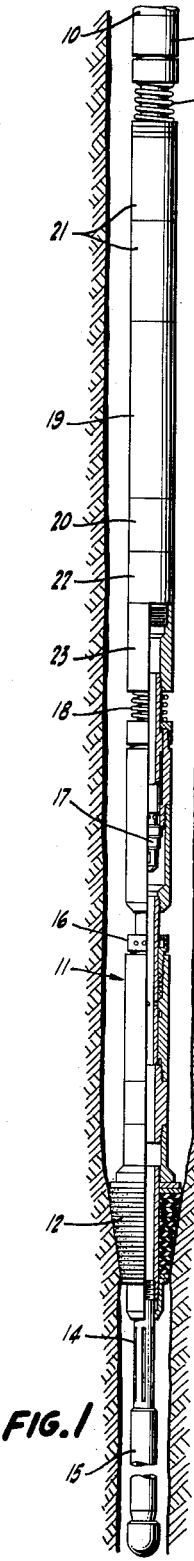
Fig. 1 is a view in longitudinal section through a well bore, showing a formation testing apparatus embodying the preferred form of my invention disposed therein, part of the testing apparatus being in section to disclose certain details of its construction and its mode of operation.

In general, the formation tester herein disclosed is of the type disclosed in a prior United States Letters Patent No. 2,073,107, issued March 9, 1937. The tester disclosed herein, however, presents certain advantages over and enables certain new and useful results to be obtained which cannot be obtained by use of the tester disclosed in said prior patent.

Essentially, the formation testing apparatus herein disclosed consists of a tester string of tubing or drill pipe 10, having a formation tester assembly 11 suspended from its lower end. The tester string or tubing 10 is made up as the tester 11 is run into the hole so that it extends, of course, to above the surface and is suspended from the draw-works for running in or pulling out and to the rotary table for rotational movement, if necessary or desirable, as in common practice.

The tester assembly 11 includes a packer 12 in this instance shown as a tapered rat-hole type packer for the purpose of simplicity. Obviously, as in conventional practice, the packer 12 may be of any suitable type, such as a bypass casing packer, which may be set to pack off in casing, or it may be a straight wall open hole packer for the purpose of packing off in an uncased bore. Below the packer 12 is a tail pipe or perforated anchor 14, and suspended from the tail pipe 14 is a pressure recorder 15 of a conventional type. Such pressure recorders operate to record continuously from the time the tool is lowered into the hole to the time it is removed from the hole the various pressures that it encounters. The perforated anchor or tail pipe 14 is, of course, for the purpose of permitting fluid in the bore below the packer to enter the tester assembly 11. The packer 12 is for the purpose of providing a seal between the formation tester and the wall of the well bore in order to remove the weight of the hydrostatic head of the mud or other fluid in the well bore above the packer from the formation to be tested.

Incorporated into the tester assembly 11 just above the packer 12 is an equalizing valve 16 which is of the telescopic sleeve type which, under certain conditions, is opened to enable the pressure both above and below the packer to be equalized in order to facilitate and enable the packer to be unseated and removed with the testing tool. Also incorporated in the tester 11 and above the equalizing valve 16 is a main valve 17 which is likewise of the telescopic sleeve type, and which is maintained closed during the time that the tester is being run into the hole and is opened only after the packer 12 has been set to pack off the space between the tester and the well bore. The main valve 17 is also closed prior to the unseating of the packer 12 and the removal of the tool from the well bore.

The equalizing valve 16 and the main valve 17 are operated by relative axial movement between the various parts of the tester 11. The details of the construction of these valves are unnecessary to an explanation of the present invention inasmuch as they are widely used and are particularly disclosed in the United States patent before referred to.

It suffices to say that when the tester 11 is being run into the hole, the equalizing valve 16 is in open condition because of its telescopic nature, and the weight of the lower portion of the tester acts by gravity to maintain it open during the running-in period. However, the minute that the packer 12 is seated and weight of the string 10 is imposed upon the tester, the equalizing valve 16 is first telescoped to closed position, as illustrated in Fig. 1, and thereafter the main valve 17 is telescoped to open position against the action of a spring 18 interposed between adjoining portions of the tester above the main valve. The main valve 17, of course, is maintained closed during the running-in period due to the action of the spring 18 and the effects of gravity on the parts.

It should also be pointed out that the equalizing valve 16 will be maintained closed and the main valve 17 will be maintained opened so long as there is sufficient weight of the running-in string 10 bearing on the tester tool 11 when the packer 12 is seated and set.

The foregoing description is, of course, correct regardless of the type of packer used. Therefore, when the parts are in the condition just referred to, there is a path for fluid from the formation below the packer 12 through the perforated anchor 14 upwardly through the packer 12, upwardly through the equalizing valve 16, and upwardly through the main or retaining valve 17 to a point above the latter.

In prior practice there has been provided in a tester 11 above the main valve 17 what was commonly termed a trip valve which was maintained closed during the time the tester was run in the hole and remained closed until it was opened by dropping a go-devil down through the tester string 10, the go-devil acting upon contact with the trip valve to open the same. The opening of this trip valve established communication between the tester itself and the tubing 10 so that the formation fluid entering the tester, as previously described, could pass upwardly through the tester into the tester tubing string 10 and be there entrapped. No means were heretofore provided for closing the trip valve hereafter inasmuch as the main valve 17 was relied upon to entrap the sample above it.

Obviously, the differential in pressure between the interior of the tubing, which is substantially at atmospheric pressure, and the pressure of the fluid in the formation under its hydrostatic head would cause the latter fluid to flow through the perforated anchor upwardly through the tester tool 11 into the tubing string 10. When a sufficient sample had been taken, an upward pull by the draw-works on the tubing string 10 and accelerated by the spring 18 would first cause closing of the main or retainer valve 17, trapping the uncontaminated sample above the tester 11 in the tubing 10. Thereafter further upward or pulling-out movement of the tubing 10 would cause the telescopic equalizing valve 16 to be opened, permitting the pressure above and below the packer to be equalized, enabling the packer to be unseated and the entire apparatus withdrawn from the well with the sample entrapped in the tubing 10 above the tester 11.

However, under certain circumstances, it is desirable to obtain a recording of the pressures in the formation before unseating the packer 12 but after the tester 11 had been closed to the further entry of formation fluid into the tubing 10. This is known as obtaining a reading of the "shut-in" pressure, and such a recording is desirable for the reason that it gives a reading of the actual formation pressure unaffected by the differential of pressure between the interior of the tester and the formation and unaffected by the weight of the hydrostatic head on the mud or other fluid in the well bore above the packer 12.

Also, such prior trip valves have been found, in some instances, to be unsatisfactory. For example, in certain areas and under certain climatic conditions, when that portion of the tester string, including the trip valve, is standing in the derrick, condensation and water accumulates on the trip valve and freezes and, in some instances, the go-devil has been unable therefore to open the trip valve.

In the present application the formation tester includes a valve above the retainer valve 17 in place of the ordinary trip valve, which may be opened and closed at will by rotation at the surface of the tester tubing string 10 in but one direction, which is to the right. This is important because rotation of the string in one direction only is possible in that rotation in two directions would have the effect in one circumstance of unmaking the joints of the tubing and the tester, as is obvious.

The improved valve structure which I have combined with the older elements of a well tester 11 includes a tubular barrel 19 having a lower head 20 and a two-part upper head 21. The lower barrel head 20 of the barrel 19 is connected by a sub 22 to a sub 23 fixed at the upper end of the tester 11. The structure of the barrel is most clearly illustrated in Figs. 6a, 6b and 6c and the manner of its incorporation intermediate the tester 11 and the tubing string 12 is illustrated clearly in Fig. 1.

The valve structure also includes a tubular operating mandrel 24 rigidly connected at its upper end by a suitable sub 25 to the lower end of the tubing string 10, as illustrated in Fig. 5a. This operating mandrel extends coaxially downward into the barrel head 21. The upper end of the barrel head is spaced from the lower end of the sub connection 25 and interposed therebetween is a heavy expansion spring 26, normally tending to move the operating mandrel 24 to its uppermost position with respect to the head 21.

Within the upper head 21 there is formed a female clutch part 27 and complementary thereto the operating mandrel 24 is formed with a male clutch part 28, and the clutch mechanism constituted of the male and female clutch parts 27 and 28 limits the upward axial movement of the operating mandrel with respect to the barrel. The downward movement of the operating mandrel 24 relative to the barrel 19 is limited by the provision of a spacing sleeve 29 interposed between the sub connection 25 between the operating mandrel and the tubing string and the upper end of the upper barrel head 21. The amount of downward axial movement permitted the mandrel 24 with respect to the barrel 19, however, is sufficient to disengage the clutch parts 27 and 28 and permit relative rotation between the operating mandrel and the barrel 19. However, when the operating mandrel 24 is in its uppermost position with respect to the barrel 19, the clutch parts 27 and 28 on the operating mandrel 24 and the barrel 19 will be in engagement, preventing relative rotation between the operating mandrel 24 and the barrel 19.

Below the clutch mechanism formed by the parts 27 and 28 the operating mandrel 24 is formed with a downwardly extending cylinder 30 within which telescopes the upper end of a valve mandrel 31, which is coaxially disposed with respect to the barrel 19 and the operating mandrel 24. The upper end of the valve mandrel 31 is provided with a head member 32 splined within the cylinder 30 of the operating mandrel, so that the valve mandrel 31 may reciprocate relative to the operating mandrel, but will be relatively fixed thereto as far as rotational movement is concerned. Thus, the operating mandrel 24 and the valve mandrel 31 will be relatively non-rotatable but the valve mandrel may reciprocate relative to the operating mandrel 24.

I desire to point out at this point that a suitable bearing 33 is provided in the upper barrel head 21 for the operating mandrel 24, which bearing 33 is provided with a suitable packing means 34 to prevent the leakage of fluid between the operating mandrel 24 and the upper barrel head 21 at the upper end of the latter. Likewise, at the lower end of the upper barrel head 21 a suitable bearing 35 (similarly packed off against fluid leakage) is provided for the valve mandrel 31. In the upper end of the lower head member 20 another bearing 36 is provided for the lower end of the valve mandrel 31, and it likewise is packed off against the passage of fluid between the exterior of the valve mandrel 31 and the barrel head 20.

Therefore, due to the provision of the various bearings heretofore described and the packing provided in conjunction with those bearings, the only manner of fluid passageway between the interior of the barrel below the bearing 36 in the lower head member 20 and upwardly through the barrel and into the tester string is through the tubular valve mandrel 31 and the tubular operating mandrel 24.

Therefore, for the purpose of establishing communication through the valve structure from the tester 11 to the tubing string 10, the valve mandrel 31 is formed with valve ports 37 at a point above the lower end thereof. The bearing 36 and the packing thereof also act as a valve sleeve for closing these ports when the valve is in closed position. It is intended when the valve is in its opened condition that the valve mandrel be capable of moving axially downward until the ports 37 are positioned at a point below the bearing 36 and its packing so that fluid may flow from the interior of the sub 22, through the ports 37 into the interior of the valve mandrel 31, and thence upwardly through the operating mandrel 24 and into the tubing 10 through the sub connection 25. However, to cut off such communication, it is intended that the valve mandrel 31 be movable axially upward in the opposite direction so that the valve ports 37 come within the confines of the valve sleeve formed by the bearing 36 and its packing, shutting off such flow.

As will be hereinafter described, I have provided an operating means or mechanism associated with the barrel 19 and with the valve mandrel 31 whereby rotation of the tubing string through the operating mandrel 24 and the valve mandrel 31 will cause reciprocation of the valve mandrel 31 a sufficient amount to alternately open and close the valve by alternately covering and uncovering the ports 37, which rotational movement for actuating the valve is in but one direction, which in this instance would be to the right.

At this point I wish to point out that the lower end of the valve mandrel is provided with a spring-loaded check valve structure 38 which closes against the flow of fluid from the barrel into the mandrel, but which will open to permit the flow of fluid downwardly through the mandrel and into the barrel when the pressure within the mandrel exceeds that in the barrel. This is for the purpose of back scuttling or reverse circulation to pump mud or other fluid into a well through the tester, if found necessary or desirable.

To effect reciprocation of the valve mandrel 31 to open and close the valve alternately by rotation of the tester string relative to the barrel in a single direction, the valve mandrel 31 is formed with a threaded section 39. This threaded section 39 is formed with double-cut threads, both right and left-hand, the threaded section 39 being intermediate the ends of the valve mandrel 31 as illustrated.

Intermediate the ends of the barrel 19 there is formed a reduced bore 40 forming a nut chamber to receive two pairs of segmental nuts, one pair being a right-hand thread and the other pair being a left-hand thread, the pairs of nuts with the right-hand thread being indicated by the numeral 41 and the segmental nuts with the left-hand thread being indicated by the numeral 42. The segmental nuts of each pair are diametrically opposed with respect to the threaded portion 39 of the mandrel 31.

Figure 2:
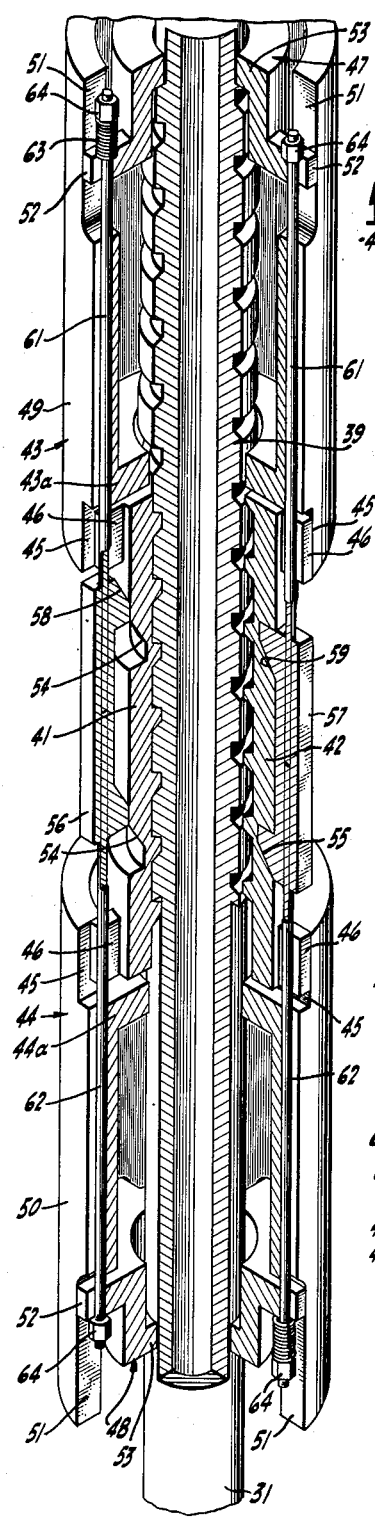
Fig. 2 is an enlarged perspective view of the valve operating mechanism, showing the same with a 90° segment cut-away to more fully disclose certain features of its construction and mode of operation, the valve mechanism being shown as removed from the barrel or casing within which it is mounted.
Figure 4:
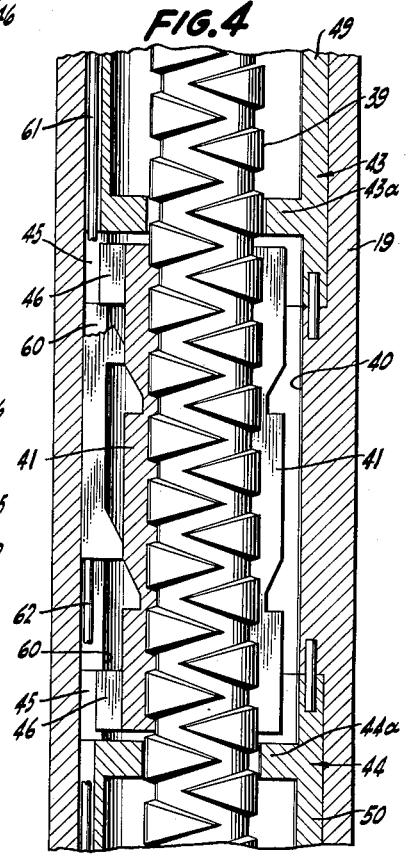
Fig. 4 is a fragmentary view in vertical section taken on line 4—4 of Fig. 3.
Figure 7:
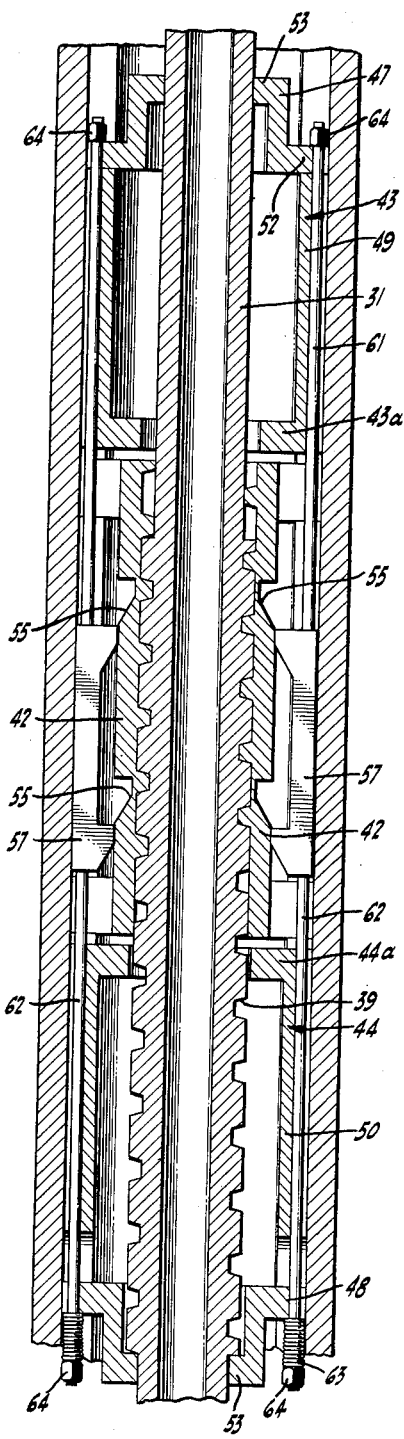
Fig. 7 is an enlarged view in central section through that portion of the valve operating mechanism taken on line 7—7 of Fig. 6.
Figure 8:
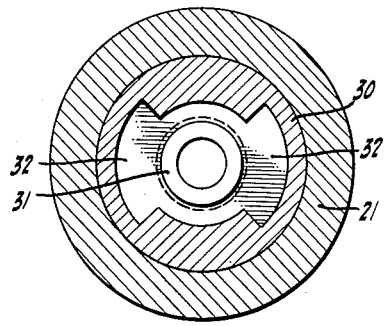
Fig. 8 is a transverse section taken on line 8—8 of Fig. 5b.
Figure 9:
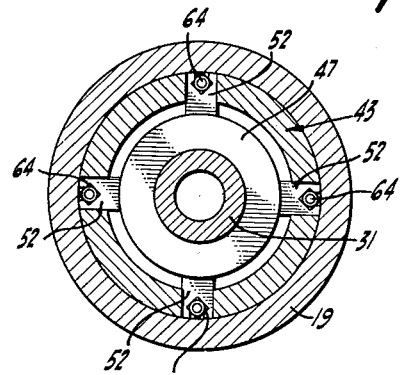
Fig. 9 is a transverse section taken on line 9—9 of Fig. 5b.
Figure 10:
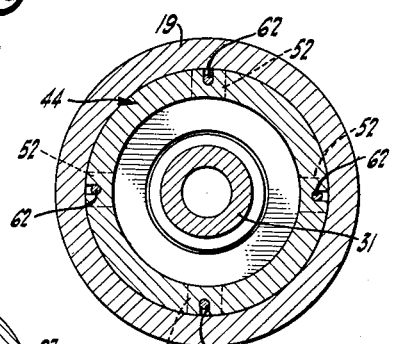
Fig. 10 is a transverse section taken on line 10—10 of Fig. 5c.
Figure 11:
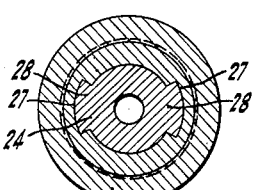
Fig. 11 is a transverse section taken on line 11—11 of Fig. 5b.

Fixed within the barrel 19 at opposite ends of the bore 40 are collars 43 and 44, the collar 43 being at the upper end of the bore 40 and the collar 44 being at the lower end of the bore 40, which collars are bored in their ends adjoining the bore 40 complementary thereto so as to form the complete nut chamber. The segmental nuts 41 and 42 are positioned between the interior flanges 43a and 44a of the collars 43 and 44, as illustrated in Figs. 2, 4 and 7 of the drawings.

The collars 43 and 44 are formed with radial sockets 45 within which radial lugs 46 formed on the segmental nuts radially project so as to form a non-rotatable engagement between the nuts and the barrel 19, although permitting the nut segments 41 and 42 to move radially a limited amount within the confines of the nut chamber 40.

Assuming that one of the pairs of the segmental nuts 41 or 42 is threadedly engaged with the threaded portion 39 of the valve mandrel 31 and relative rotation between that mandrel and the barrel 19 occurs, the nuts being collared against movement with respect to the barrel, the valve mandrel, will move longitudinally as it rotates in a direction depending upon with which set of nuts 41 and 42 it is engaged.

Figure 3:
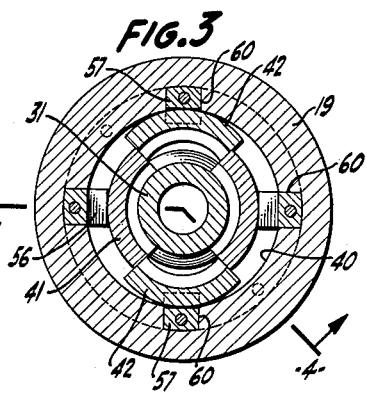
Fig. 3 is a transverse sectional view taken on line 3—3 of Fig. 5b, with parts broken away for convenience in illustration.

Although each segment of the pairs of nut segments 41 and 42 extends through ninety degrees, they are not divided on lines purely radial to their concentric axes, so that but one pair of these segments can be engaged with the threads 39 of the valve mandrel 31 at a time. When so engaged, as illustrated in Fig. 3, the other pair of segments is locked out of engagement with the mandrel because of the formation of the coacting faces between the segments, as previously described. Therefore, the pair of segments engaged with the threaded section 39 of the mandrel must be moved completely out of engagement with the threads before the other pair of nut segments may be moved into engagement therewith.

I have provided means operated by the valve mandrel 31 itself at the extremity of each of its strokes for disengaging the then engaged pair of nut segments 41 or 42, and causing engagement of the other pair of segments 41 or 42 with the threaded section 39 of the mandrel 31. This means or mechanism includes an actuating member 47 above the upper collar 43 and a similar actuating member 48 at the lower end of the lower collar 44.

It will be noticed that the collars 43 and 44, respectively, have oppositely extending skirts 49 and 50, respectively, having radial slots 51 therein to engage radial lugs or ears 52 on the actuating members 47 and 48, so that the actuating members 47 and 48 may reciprocate relative to the collars 43 and 44 and the barrel 19, but are relatively rotatably fixed thereto.

Each of the actuating members 47 and 48 has an internal shoulder 53 of a diameter agreeing with the root diameter of the threads on the threaded section 39 of the mandrel 31, so as to engage the end of the threads of the section 39 of the mandrel 31 at the appropriate time. That is to say, when the upper end of the threaded section 39 contacts the inturned shoulder 53 of the actuating member 47 and the mandrel 31 continues to move upwardly, it will move the actuating member 47 axially upward. Likewise, when the lower end of the threaded section 39 of the mandrel 31 contacts the inturned shoulder 53 of the lower actuating member 48, and the mandrel continues to move downwardly, the lower actuating member 48 will move axially downward.

I rely upon this operation of the actuating members 47 and 48 to alternately engage and disengage the pairs of segmental nuts 41 and 42 with the threaded section 39 of the mandrel 31 so as to effect reciprocation thereof to open and close its valve ports, when the tester string 10 is rotated relative to the barrel 19.

To effect this operation, the nut segments 41 and 42 are formed with circumscribing cam grooves 54 and 55, which cam grooves are formed alike in the pair of segments 42, but are oppositely formed in the pair of segments 41. A pair of axial cam members 56 are provided for engagement with the cam grooves 54 in the segments 41, which cam members are disposed at 180 degrees apart, and a pair of cam members 57 are formed for cooperation with the cam grooves 55 in the segments 42. The cam faces 58 and 59 of the sets of cams 56 and 57 are, of course, oppositely formed so as to cooperate with the respective cam grooves 54 and 55. The cam members 56 and 57 are arranged in longitudinal radial slots 60 formed both in the bore 40 and in the adjacent ends of the collars 43 and 44. The slots 60 are of a length exceeding the length of the cam members 56 and 57 in order that the latter may have a limited amount of endwise movement therein and relative to the nut segments 41 and 42.

To actuate these cams, they are each provided with a pair of longitudinal actuating rods, each pair comprising an upper rod 61 and a lower rod 62. The rods for each cam extend thereinto from opposite directions as is apparent from Fig. 2, and are fixed to the cam. The rods 61 extend upwardly through suitable grooves in the collar 43 and connect with the lugs 52 of the actuating member 47. The rods 62 extend downwardly through similar grooves and connect with the lugs 52 of the actuating member 48. It will be noticed that the rods 61 of the cam members 56 have a spring 63 interposed between the upper face of the lugs 52 of the actuating member 47 and a nut 64 at the upper end of the rods. The actuating rods 61 of the cams 57 do not have such a spring 63, but the nut 64 is adapted to bear directly on the top face of the lugs 52. The exact reverse of this is true as to the rod connections 62 between the cams 56 and 57 and the lugs 52 of the lower actuating member 48.

To illustrate the operation of the device, in Figs. 5b and 5c I have shown the parts in the position which they assume when the mandrel 31 is in the uppermost end of its stroke. Prior to moving to the uppermost end of its stroke, the valve mandrel 31 has moved the actuating member 47 upwardly a sufficient distance to compress upper springs 63 and therefore urge cam member 56 upwardly so that the cams function to cam segments 41 inwardly. As the actuating member 47 is moved further upwardly so as to progressively register cams 57 with their nut segments 42, the nut segments 42 can be progressively forced or cammed out by the inwardly cammed or urged nut segments 41, see Fig. 3 where it is evident that nut segments 41 have been cammed inwardly by their cams 56 and have in turn cammed nut segments 42 outwardly.

Therefore, continued rotation of the valve mandrel in the same direction would then, through its engagement with a different set of threads and nut segments, cause the valve mandrel 31 to move downwardly until it engages the lower actuator 48. There then takes place precisely the exact operation just described except a reversal of the order of actuation of the cams, effecting disengagement of the segments 42 and reengagement of the segments 41, so that the valve mandrel 31, while continuing to rotate in the same direction, will again reverse its direction of endwise movement. The stroke of the valve mandrel 31 is sufficient to place the valve mechanism alternately in opened and closed positions. That is to say, it is sufficient to cover or uncover the valve ports 37 of the valve mandrel 31, as previously described.

In operation of the testing apparatus herein disclosed, it is constructed and assembled substantially as illustrated and described herein. As it is lowered into the well bore, the equalizing valve 16 will be opened due to the effects of gravity and the telescopic connection between the parts, and the main or retaining valve 17 may be closed for the same reason and also due to the effects of the spring 18. During this time, due to the provision of the spring 26 and the effects of gravity, the operating mandrel 24 will be clutched to the barrel 19 through engagement of the clutch parts 27 and 28, and the barrel 19, the operating mandrel 24 and the tester string 10 will be relatively non-rotatable. The fact that the barrel cannot rotate relative to the mandrel 24 and the tester string 10 is important in that it positively locks the valve structure against opening or closing movement, or any operation, during the lowering of the tool and string into the well bore. Obviously, while lowering the tool into the well bore, the parts have been conditioned so that the valve structure is in closed condition with the ports 37 within the valve sleeve formed by the bearing 36.

The fact that valve operation is prevented during the lowering of the tool in the hole is important in that in deep wells, particularly if they are crooked, rotation of the lower end of the tool is likely to occur, and would very likely occur if the barrel 19 were free to rotate relative to the tubing string 10 and the mandrel 24 during the lowering operation.

When the tool reaches the point of testing, the packer is set and assumes a fixed position in the well bore. This is regardless of whether a rat-hole type packer is used or another type previously referred to herein is employed. When the packer has been packed off and sealing has been accomplished by letting down weight of the tubing string, further imposed weight will, of course, be supported by the packer. As the weight is let down, the retaining valve 16 is immediately closed and thereafter additional weight will overcome the spring 18 and open the main or retaining valve 17. Likewise, this weight will overcome the spring 26 and will lower the mandrel 24 relative to the barrel 19, which is rigidly fixed to the tester, disengaging the clutch parts 27 and 28 so as to permit relative rotation between the operating mandrel 24 and the barrel 19. The barrel 19 is held from rotation, of course, due to its connection through the tester to the packer which is fixed to the wall of the hole or casing.

Of course, the minute that the retaining or main valve 17 is opened, fluid from the formation will enter the tail pipe or anchor 14 and pass upwardly through the packer 12 and the main valve 17 to the point of the sleeve valve formed by the bearing 36 in the lower head 20 of the barrel 19. It can, however, proceed no further until the valve ports 37 are lowered to a point where they are uncovered below the valve sleeve formed by the bearing 36.

When it is desired to take a test, the tubing string 10 is rotated at the surface a sufficient number of turns to cause the valve operating mechanism just previously described, through the medium of relative rotation between the operating mandrel 24 and the valve mandrel 31 relative to the barrel 19, to lower the valve mandrel 31 to a point uncovering its valve ports 37. Immediately that this occurs, the fluid from the formation will flow through the ports 37 upwardly through the mandrels 24 and 31 and into and upwardly in the tester string 10.

When a sufficient sample has been taken, the tubing string 10 is again rotated in the same direction a sufficient number of turns so that the valve mandrel moves upwardly, due to the provision of the valve actuating mechanism previously described, moving the ports 37 to a point within the valve sleeve formed by the bearing 36, closing the ports. This, as is obvious, is accomplished without the necessity of unseating the packer 12, so that the formation being tested still remains relieved of the hydrostatic head of the mud fluid in the bore above the packer 12. Likewise, there no longer being a path for fluid flow upwardly through the tester for the formation fluid, the pressure in the well bore below the packer will build up until it equals the formation pressure, which pressure changes will all be recorded by the pressure recorder 15.

By this means a shut-in test will be taken and the results thereof will be recorded by the pressure recorder 15. Thereafter, the valve mechanism can be opened if desired by further rotation of the tubing string 10, or it can be permitted to remain closed and the tool removed from the hole with the sample trapped above the valve. Obviously, the first operation which occurs when an upward pull is exerted on the drilling string 10 is to move the clutch parts 27 and 28 into engagement to prevent relative rotation and valve operation during the pulling out operation, and then the main or retainer valve 17 is closed and thereafter the equalizing valve 16 is opened, the opening of which equalizing valve equalizes the pressure both above and below the packer so that subsequent upward movement of the testing string 10 will unseat the packer and remove the entire tool from the hole.

From the foregoing it is obvious that I have provided an improved testing apparatus by means of which a valve in a tester may be positively opened and closed and be locked against operation during the running-in and pulling-out operations of the tester. Also, with a device constructed in accordance with my invention, a shut-in test may be easily and efficiently obtained without interfering with the normal functions of the tester, while enabling the tester to be used also in a more or less conventional manner.

It is further apparent that I have equipped a formation tester with a valve which will be positively operated by mere rotation of the tester string in a single direction, which rotation will act to alternately open and close the valve at the operator's option.

While I have shown the preferred form of my invention, it is to be understood that various changes may be made in its construction by those skilled in the art without departing from the spirit of the invention as defined in the appended claims.

Having thus described my invention, what I claim and desire to obtain by Letters Patent is:

1. A valve structure adapted to be interposed between an oil well formation tester and a tester string whereby fluid from the tester may flow through the valve structure to the tester string of pipe, said valve structure comprising a barrel fixedly connected to the upper end of the formation tester and suspended from the lower end of the tester string, a tubular operating mandrel fixedly connected to the tester string of pipe and extending downwardly into said barrel, a tubular valve mandrel mounted for axial and rotative movement within said barrel and reciprocably but non-rotatably connected at its upper end to the lower end of the operating mandrel, an intermediate threaded section on said valve mandrel being formed with two threads disposed in opposite pitch to each other, said valve mandrel having valve ports adjacent its lower end, a complemental valve mechanism associated with the valve mandrel and the barrel to be opened for fluid flow from the barrel into the mandrel and closed against such flow by reciprocation of the valve mandrel in the barrel, feed nut segments collared within the barrel, at least one segment having right-hand threads formed thereon and at least one other segment having left-hand threads formed thereon, means for causing the feed nut segments having threads of one hand to engage the threads on the valve mandrel at one end its reciprocable stroke and to release said segments and engage the segments of opposite hand at the other end of its reciprocable stroke whereby continuous rotation of the valve mandrel relative to the barrel in one direction will cause the valve mandrel to reciprocate and alternately open and close the valve mechanism.

2. A valve structure adapted to be interposed between an oil well formation tester and a tester string whereby fluid from the tester may flow through the valve structure to the tester string of pipe, said valve structure comprising a barrel fixedly connected to the upper end of the formation tester to receive fluid therefrom and suspended from the tester string, a tubular operating mandrel fixedly connected to the tester string and extending downwardly into said barrel, a tubular valve mandrel mounted for longitudinal and rotational movement within said barrel and reciprocably but non-rotatably connected at its upper end to the operating mandrel, a threaded section on said valve mandrel being formed with two threads disposed in opposite pitch to each other, said valve mandrel having valve ports adjacent its lower end, a valve sleeve within the barrel and positioned so that the valve mandrel upon endwise movement may be positioned with the ports closed within the valve sleeve or opened without the sleeve, collared feed nut segments mounted within the barrel, at least one segment having right-hand threads formed thereon and at least one other segment having left-hand threads formed thereon, means for causing the feed nut segments having threads of one hand to engage the threads on the valve mandrel at one end of its reciprocable stroke and to release said segments and engage the segments of opposite hand at the other end of its reciprocable stroke whereby continuous rotation of the valve mandrel in one direction will cause it to reciprocate its valve ports alternately to an open or closed position.

3. A valve structure adapted to be interposed between an oil well formation tester and a tester string whereby fluid from the tester may flow through the valve structure to the tester string of pipe, said valve structure comprising a barrel fixedly connected to the upper end of the formation tester and suspended from the tester string, a tubular operating mandrel fixedly connected to the tester string of pipe and extending downwardly into said barrel and capable of a limited amount of axial movement relative thereto, a clutch mechanism between said operating mandrel and the barrel effective to clutch the barrel and mandrel against relative rotation and to unclutch the same to permit relative rotation therebetween by relative axial movement between the barrel and mandrel, a tubular valve mandrel mounted for longitudinal and rotational movement within said barrel and reciprocably but non-rotatably connected to the operating mandrel, a threaded section on said valve mandrel being formed with two threads disposed in opposite pitch to each other, said valve mandrel having valve ports adjacent its lower end, a valve sleeve within the barrel and positioned so that the valve mandrel upon endwise movement may be positioned with the ports closed within the sleeve or opened without the sleeve, and feed nut segments some having left-hand threads and the remainder having right-hand threads collared within the barrel, means to engage all of the segments of one hand with the threads on the valve mandrel at one end of its endwise stroke and to disengage said segments of one hand and engage the segments of opposite hand at the other end of its endwise stroke whereby continuous rotation of the valve mandrel in one direction relative to the barrel will cause it to reciprocate its ports alternately to an open or closed position.

4. A valve structure adapted to be interposed between an oil well formation tester and a tester string whereby fluid from the tester may flow through the valve structure to the tester string of pipe, said valve structure comprising a barrel fixedly connected to the upper end of the formation tester and suspended from the tester string, a tubular operating mandrel fixedly connected at its upper end to the tester string of pipe and with its lower end extending downwardly into said barrel, a clutch between the barrel and mandrel operable by relative axial movement therebetween to release the barrel and mandrel for rotation relative to one another or to prevent such rotation depending on the direction of axial movement between the barrel and mandrel, a tubular valve mandrel mounted for longitudinal and rotational movement within said housing and reciprocably but non-rotatably connected at its upper end to the lower end of the operating mandrel, a threaded section on said valve mandrel being formed with a right-hand and a left-hand thread, said valve mandrel having valve ports therein to establish communication between the barrel, the interior of the mandrels and the tester string, a valve sleeve within the barrel and positioned so that the valve mandrel upon endwise movement may be positioned with the ports closed within the valve sleeve or opened below the valve sleeve in the barrel, and feed nut segments some having lefthand threads and the remainder having right-hand threads collared within the barrel, means to engage all of the segments of one hand with the threads on the valve mandrel at one end of its endwise stroke and to disengage said segments of one hand and engage the segments of opposite hand at the other end of its endwise stroke whereby continuous rotation of the valve mandrel relative to the barrel in one direction will cause it to reciprocate its ports alternately to an open or closed position.

5. A valve structure adapted to be interposed between an oil well formation tester and a tester string whereby fluid from the tester may flow through the valve structure to the tester string of pipe, said valve structure comprising a barrel fixedly connected to the upper end of the formation tester to receive fluid therefrom and suspended from the tester string, a tubular operating mandrel fixedly connected to the tester string and extending downwardly into the barrel, a valve operating mandrel mounted for longitudinal and rotational movement within said valve and reciprocably but non-rotatably connected at its upper end to the operating mandrel, a threaded section on said valve operating mandrel formed with two threads disposed in opposite pitch to each other, a valve operable by the valve operating mandrel upon reciprocation thereof to alternately open and close the valve, and feed nut segments mounted within the valve, at least one segment having righthand threads thereon and another segment having lefthand threads thereon, and means for causing the feed nut sections of one hand to engage the threads on the valve operating mandrel at one end of its reciprocable stroke and to release said sections of one hand and engage the sections of opposite hand at the other end of its reciprocable stroke whereby continuous rotation of the valve mandrel in one direction will cause it to reciprocate to alternately open and close the valve.

References Cited in the file of this patent

UNITED STATES PATENTS

| | | |
|---|---|---|
| 1,801,633 | MacKirdy | Apr. 21, 1931 |
| 1,804,247 | Conner | May 5, 1931 |
| 2,073,107 | Johnston | Mar. 9, 1937 |
| 2,085,972 | Halliburton | July 6, 1937 |
| 2,218,988 | Johnston et al. | Oct. 22, 1940 |
| 2,227,192 | Losey | Dec. 31, 1940 |